(12) United States Patent
Lee (10) Patent No.: US 7,643,577 B2
(45) Date of Patent: Jan. 5, 2010

(54) CARRIER AND SYMBOL TIMING RECOVERY APPARATUS USABLE WITH A VESTIGIAL SIDE BAND RECEIVER AND RECOVERY METHOD THEREOF

(75) Inventor: Dong-hoon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 638 days.

(21) Appl. No.: 11/237,815

(22) Filed: Sep. 29, 2005

(65) Prior Publication Data

US 2006/0078071 A1 Apr. 13, 2006

(30) Foreign Application Priority Data

Oct. 7, 2004 (KR) .................. 10-2004-0079992

(51) Int. Cl.
*H03D 1/24* (2006.01)
(52) U.S. Cl. .................. 375/321; 375/270; 375/344; 375/355
(58) Field of Classification Search .................. 375/270, 375/277, 321, 326, 344; 329/356–357
See application file for complete search history.

(56) References Cited

U.S. PATENT DOCUMENTS

| | | | | |
|---|---|---|---|---|
| 3,872,381 A * | 3/1975 | Yamamoto et al. | ........... | 375/290 |
| 5,809,088 A * | 9/1998 | Han | ............. | 375/344 |
| 5,940,450 A * | 8/1999 | Koslov et al. | ............ | 375/344 |
| 6,081,563 A * | 6/2000 | Taga et al. | ............... | 375/344 |
| 6,115,431 A * | 9/2000 | Lee | ............. | 375/324 |
| 6,133,964 A * | 10/2000 | Han | ............. | 348/726 |
| 6,539,063 B1 * | 3/2003 | Peyla et al. | ............... | 375/267 |
| 6,891,898 B2 * | 5/2005 | Peyla et al. | ............... | 375/267 |
| 6,983,028 B2 * | 1/2006 | Ahn | ............. | 375/326 |
| 6,985,192 B1 * | 1/2006 | Bouillet et al. | ............. | 348/735 |

(Continued)

FOREIGN PATENT DOCUMENTS

CN 1351787 A 5/2002

(Continued)

OTHER PUBLICATIONS

Chinese Office Action issued Nov. 7, 2008 in Chinese Application No. 200510108075.2.

*Primary Examiner*—Jean B Corrielus
(74) *Attorney, Agent, or Firm*—Stanzione & Kim LLP (57) ABSTRACT

A carrier and symbol timing recovery apparatus usable in a VSB (Vestigial Side Band) receiver, and a method thereof. For a carrier and symbol timing recovery, error information is detected using a pilot signal, an upper sideband and a lower sideband of a received signal. Each of the detected error information is multiplied by a predetermined weight, respectively, and the results of the respective multiplications are added/combined. Therefore, even though the pilot signal may be corrupted, the carrier recovery can nevertheless be accurately performed. Additionally, even though the upper sideband of a received VSB-modulated signal may be corrupted, the lower sideband can be utilized to perform the symbol timing recovery. As a result, performance of a receiving system can be improved even under unfavorable channel characteristics. Moreover, since the carrier recovery and the symbol timing recovery are executed through a single apparatus, it becomes possible to simplify a hardware implementation thereof.

46 Claims, 6 Drawing Sheets

U.S. PATENT DOCUMENTS

| | | | |
|---|---|---|---|
| 7,079,605 B1 * | 7/2006 | Isaksen et al. | 375/344 |
| 7,245,677 B1 * | 7/2007 | Pare, Jr. | 375/344 |
| 7,251,295 B2 * | 7/2007 | Jun | 375/326 |
| 7,366,257 B2 * | 4/2008 | Jun | 375/326 |
| 2001/0006539 A1 * | 7/2001 | Kim | 375/321 |
| 2002/0105599 A1 * | 8/2002 | Hong et al. | 348/726 |
| 2003/0053550 A1 * | 3/2003 | Peyla et al. | 375/267 |
| 2003/0224725 A1 * | 12/2003 | Limberg | 455/23 |
| 2004/0165682 A1 * | 8/2004 | Jun | 375/326 |
| 2004/0258184 A1 * | 12/2004 | Liu et al. | 375/350 |
| 2006/0078070 A1 * | 4/2006 | Zhidkov et al. | 375/326 |

FOREIGN PATENT DOCUMENTS

| | | |
|---|---|---|
| KR | 2001-40076 A | 5/2001 |
| KR | 2003-65082 A | 8/2003 |
| WO | WO 98/14005 | 4/1998 |

* cited by examiner

CARRIER AND SYMBOL TIMING RECOVERY APPARATUS USABLE WITH A VESTIGIAL SIDE BAND RECEIVER AND RECOVERY METHOD THEREOF

CROSS-REFERENCE TO RELATED APPLICATIONS

This application claims the benefit under 35 U.S.C. § 119 from Korean Patent Application No. 2004-79992 filed on Oct. 7, 2004 in the Korean Intellectual Property Office, the entire content of which is incorporated herein by reference.

BACKGROUND OF THE INVENTION

1. Field of the Invention

The present general inventive concept relates in general to a carrier and symbol timing recovery apparatus usable with a Vestigial Side Band (VSB) receiver and a recovery method thereof. More specifically, the present general inventive concept relates to an apparatus to recover carrier and symbol timing more effectively by using a pilot signal, an upper side band, and a lower side band of a VSB signal, and a recovery method thereof.

2. Description of the Related Art

In order for a data receiver that receives data transmitted according to Vestigial Side Band (VSB) modulation mechanism to accurately demodulate the VSB-modulated data, it is necessary to minimize frequency offset and high levels of phase noise (jitter) generated from a tuner or an RF oscillator used for data reception. This procedure is called 'carrier recovery.'

In order to receive the data more accurately, the data receiver should be able to generate a clock signal that is the same as a clock signal used in a data transmitter. This procedure is called 'symbol timing recovery.'

A digital broadcast system based on the VSB modulation method in conformity with American digital television standards of the Advanced Television Systems Committee (ATSC) utilizes a pilot signal contained in a transmitted signal for carrier synchronization. The pilot signal is a signal that is loaded on a carrier for transmission such that the carrier can be accurately recovered at the data receiver.

Typically, symbol timing recovery methods use data segment sync signals that are regularly inserted by the data transmitter during the data transmission, or a Band Edge Component Maximization (BECM) algorithm.

Figure 1:
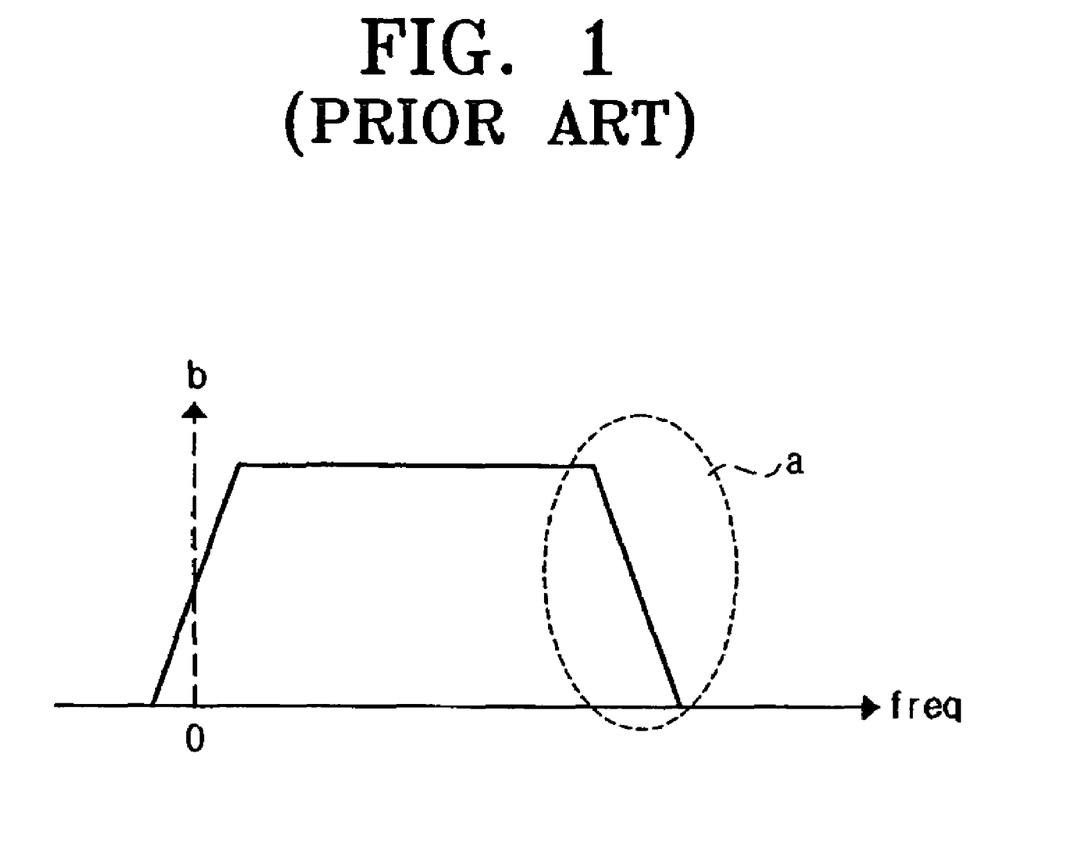
FIG. 1 graphically illustrates a frequency spectrum of a VSB signal including a pilot signal.

FIG. 1 illustrates a frequency spectrum of a VSB signal including a pilot signal.

The frequency spectrum of FIG. 1 is a generic VSB signal having the pilot signal transmitted to a baseband. The frequency spectrum of a digital broadcast signal defined by the ATSC standard is typically the same as the frequency spectrum illustrated in FIG. 1, except that a bandwidth thereof is approximately 6 MHz.

In FIG. 1, 'a' represents an upper sideband of a received signal for use in the BECM algorithm, and 'b' represents the pilot signal of the received signal.

Figure 2:
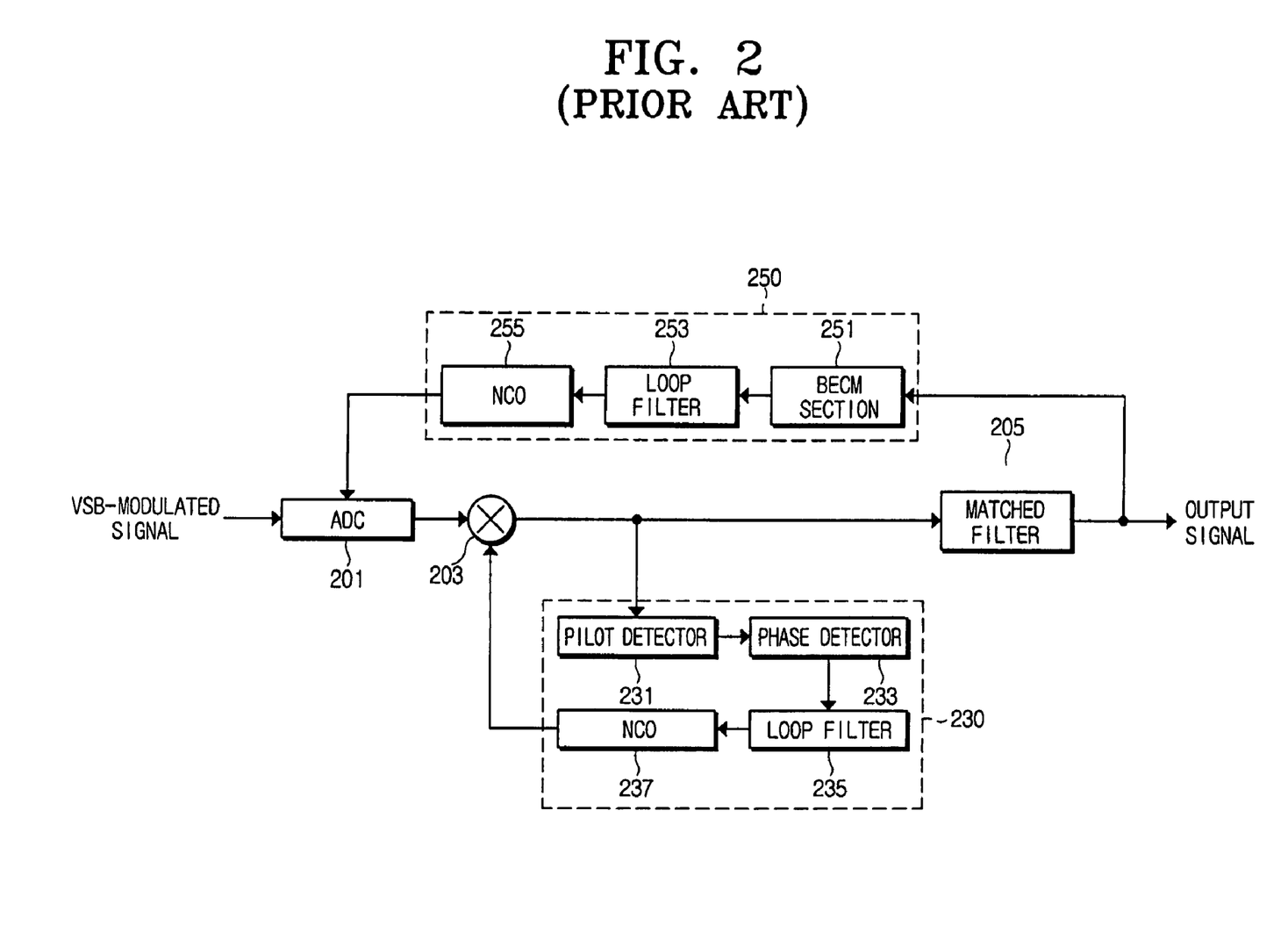
FIG. 2 is a schematic block diagram illustrating a conventional digital broadcast receiver.

FIG. 2 is a schematic block diagram illustrating a conventional digital broadcast receiver.

Referring to FIG. 2, the conventional digital broadcast receiver 200 includes an Analog to Digital Converter (ADC) 201, a multiplier 203, a matched filter 205, a carrier recovery circuit 230 that uses the pilot signal, and a symbol timing recovery circuit 250 that uses the BECM algorithm.

The carrier recovery circuit 230 includes a pilot detector 231, a phase detector 233, a loop filter 235, and a Numerically Controlled Oscillator (NCO) 237.

The received signal is digitized by the ADC 201, and is output as a baseband signal through the multiplier 203.

The pilot detector 231 of the carrier recovery circuit 230 detects the pilot signal from the baseband signal, and the phase detector 233 reads phase error information of the pilot signal. Methods for reading the phase error information differ depending on the application. The phase error information acquired by the phase detector 233 is provided to the loop filter 235, is converted to a frequency component by the NCO 237, and is multiplied by the received signal in the multiplier 203.

The carrier recovery circuit 230 repeats the above-described procedure until a phase error of the pilot signal, which is indicated by the phase error information, is reduced to zero.

The symbol timing recovery circuit 250 includes a BECM section 251, a loop filter 253, and an NCO 255.

The baseband signal generated by the multiplier 203 is provided to the matched filter 205, is filtered by the matched filter 205, and is input to the symbol timing recovery circuit 250.

The BECM section 251 outputs error information from a symbol clock from a signal that is input thereto (i.e., an output signal of the matched filter 205) to the loop filter 253, and the loop filter 253 outputs a control voltage that corresponds to the error information to control the NCO 255. Next, the NCO 255 adjusts a sampling clock input to the ADC 201 according to the control voltage received from the loop filter 253.

For accurate demodulation of the received signal, it is very important that both the carrier recovery and the symbol timing recovery are smoothly and properly performed. If one of them fails, it can be impossible to demodulate the received signal accurately.

In practice, however, a lot of noise coexists in a wireless environment or in channels over which signals are broadcasted. Therefore, a signal having the frequency spectrum that is similar to the frequency spectrum illustrated in FIG. 1 is not typically received. Additionally, both the pilot signal and the upper sideband signal of the received signal can be substantially corrupted by the noise.

The corrupted pilot signal indicates that the carrier cannot be recovered properly from the received signal. This causes a deterioration in data receiving performance of the system having the conventional digital broadcast receiver.

Moreover, in some cases, a received VSB-modulated signal is distorted on a transmission channel and thus, the upper sideband thereof is substantially corrupted. This also results in the performance degradation of the conventional digital broadcast receiver and the corresponding system. In particular, the corruption of the upper sideband occurs more often in a multi-path environment, thereby causing deteriorations in the data receiving performance.

Digital broadcast systems based on the VSB method are not completely exempted from the deteriorations in the data receiving performance and the performance degradations of the carrier and symbol timing recoveries due to the corruption of the received signal.

SUMMARY OF THE INVENTION

The present general inventive concept provides a carrier and symbol timing recovery apparatus usable with a VSB (Vestigial Side Band) receiver, which is capable of recovering carrier and symbol timing irrespective of corruptions in a pilot signal and/or an upper sideband contained in a received signal, and a recovery method thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a carrier and symbol timing apparatus usable with a VSB (Vestigial Side Band) receiver, in which the apparatus includes: an analog to digital converter (ADC) to receive a VSB-modulated signal and to convert the received VSB-modulated signal to a digital signal using a predetermined sampling clock, a multiplier to multiply the digital signal by a carrier signal of a predetermined frequency to convert a result of the multiplication to a baseband VSB signal, an error detector to perform a predetermined algorithm on an upper sideband and a lower sideband of the baseband VSB signal, respectively, to generate upper error information and lower error information based on a difference between phase information of the received VSB-modulated signal and a predetermined reference phase information, a carrier generator to combine the upper error information and the lower error information and to generate a frequency offset-corrected carrier accordingly, and a sample clock generator to combine the upper error information and the lower error information and to generate a symbol clock error-corrected sampling clock accordingly.

The predetermined algorithm may comprise a BECM (Band Edge Component Maximization) algorithm.

The error detector may include: an upper BECM section to perform the BECM algorithm on the baseband VSB signal to generate the upper error information, a spectrum inverter to invert the upper sideband and the lower sideband of the baseband VSB signal to invert a frequency spectrum thereof, and a lower BECM section to perform the BECM algorithm on the spectrum inverted signal to generate the lower error information.

The spectrum inverter may detect and remove a pilot signal contained in the baseband VSB signal before inverting the frequency spectrum of the baseband VSB signal.

The error detector may further include: a pilot detector to detect a pilot signal contained in the baseband VSB signal, and a phase detector to detect pilot phase information from the detected pilot signal as the phase information of the received VSB-modulated signal and to output the pilot phase information to the carrier generator.

The carrier generator may include: a first combiner to multiply the pilot phase information, the upper error information, and the lower error information by predetermined weights, respectively, and to output a sum of the respective multiplication results as carrier error information, a first loop filter to filter a first low-band signal from the carrier error information, and a first NCO (Numerically Controlled Oscillator) to output the frequency offset-corrected carrier to the multiplier under the control of the filtered first low-band signal.

The sample clock generator may include: a second combiner to multiply the upper error information and the lower error information by predetermined weights, respectively, and to output a sum of the respective multiplication results as symbol timing error information, a second loop filter to filter a second low-band signal from the symbol timing error information, and a second NCO to output the symbol clock error-corrected sampling clock to the ADC under the control of the filtered second low-band signal.

The predetermined weights may vary depending on reliabilities of the pilot phase information, the upper error information, and the lower error information, respectively, under different channel characteristics.

The carrier generator may include: a first combiner to multiply the upper error information and the lower error information by predetermined first and second weights, respectively, and to output a sum of the respective multiplication results as carrier error information, a first loop filter to filter a first low-band signal from the carrier error information, and a first NCO to output the frequency offset-corrected carrier to the multiplier under the control of the filtered first low-band signal. Additionally, the sample clock generator may include: a second combiner to multiply the upper error information and the lower error information by predetermined third and fourth weights, respectively, and to output a sum of the respective multiplication results as symbol timing error information, a second loop filter to filter a second low-band signal from the symbol timing error information, and a second NCO to output the symbol clock error-corrected sampling clock to the ADC under the control of the filtered second low-band signal.

Among the first, second, third, and fourth weights, the first and second weights may be the same symbols, and the third and fourth weights may be different symbols.

Alternatively, the first and second weights may be different symbols, and the third and fourth weights may be the same symbols.

The VSB-modulated signal may comprise a digital broadcast signal that conforms to standards of the ATSC (Advanced Television System Committee).

The foregoing and/or other aspects of the present general inventive concept are also achieved by providing a recovery apparatus usable with a digital broadcast receiver, the apparatus comprising a receiving unit to receive a signal having a carrier and a clock on a wireless channel and to generate a baseband signal from the received signal, an error detector to detect error information in at least two portions of the baseband signal, and a carrier generator to generate a frequency offset adjusted carrier by combining the detected error information of the at least two portions of the baseband signal.

The foregoing and/or other aspects of the present general inventive concept are also achieved by providing a recovery apparatus usable in a digital broadcast receiver, the recovery apparatus comprising an error detector to receive a baseband signal and to detect a first error relating to a phase of a pilot signal thereof, a second error relating to a phase of a lower sideband thereof, and a third error relating to a phase of an upper sideband thereof, and a recovery unit to determine whether any of the pilot signal, the upper sideband, and the lower sideband are corrupted, to recover an original clock and an original carrier according to at least one of the first, second, and third errors based on the determination, and to output the original clock and the original carrier used at a transmitting device.

The foregoing and/or other aspects of the present general inventive concept are also achieved by providing a recovery apparatus, comprising an error detector to receive a baseband VSB signal and to detect a frequency offset of a pilot signal, an upper sideband, and a lower sideband, and a carrier generator to generate a frequency offset corrected carrier using the detected frequency offsets of the pilot signal, the upper sideband, and the lower sideband.

The foregoing and/or other aspects of the present general inventive concept are also achieved by providing a digital broadcast receiver comprising a carrier and symbol timing recovery apparatus. The carrier and symbol timing recover apparatus includes an error detector to receive a baseband signal and to detect a first error relating to a phase of a pilot signal thereof, a second error relating to a phase of a lower sideband thereof, and a third error relating to a phase of an upper sideband thereof, and a recovery unit to determine whether any of the pilot signal, the upper sideband, and the lower sideband are corrupted, to recover an original clock and an original carrier according to at least one of the first, second, and third errors based on the determination, and to output the original clock and the original carrier.

The foregoing and/or other aspects of the present general inventive concept are also achieved by providing an error and symbol timing recovery method usable in a VSB receiver. The method includes: receiving a VSB-modulated signal and converting the received VSB-modulated signal to a digital signal using a predetermined sampling clock, multiplying the digital signal by a carrier signal of a predetermined frequency to convert a result of the multiplication to a baseband VSB signal, performing a predetermined algorithm on an upper sideband and a lower sideband of the baseband VSB signal, respectively, to generate upper error information and lower error information based on a difference between phase information of the received VSB-modulated signal and a predetermined reference phase information, combining the upper error information and the lower error information and generating a frequency offset-corrected carrier accordingly, and combining the upper error information and the lower error information and generating a symbol clock error-corrected sampling clock accordingly.

The generating of the upper error information and the lower error information may include: performing a BECM algorithm on the baseband VSB signal to generate the upper error information, inverting the upper sideband and the lower sideband of the baseband VSB signal to invert a frequency spectrum thereof, and performing the BECM algorithm on the spectrum inverted signal to generate the lower error information.

The generating of the frequency offset-corrected carrier may comprise multiplying the upper error information and the lower error information by a first and a second weight, respectively, and adding the respective multiplication results together. The generating of the symbol clock error-corrected sampling clock may comprise multiplying the upper error information and the lower error information by a third and a fourth weight, respectively, and adding the respective multiplication results together. Additionally, among the first, second, third, and fourth weights, the first and second weights may be the same symbols, and the third and fourth weights may be different symbols. Alternatively, the first and second weights may be different symbols, and the third and fourth weights may be the same symbols.

The foregoing and/or other aspects of the present general inventive concept are also achieved by providing a method of recovering a carrier and symbol timing usable with a VSB receiver, the method comprising receiving a signal having a carrier and a clock on a wireless channel, determining phase information for at least a first portion of the received signal and a second portion of the received signal, generating a first error information and a second error information to correspond with the first portion and the second portion of the received signal, respectively, by comparing the phase information of the first and second portions with a reference phase information, and combining the first error information and the second error information to produce a frequency offset-corrected carrier and symbol clock error-corrected sampling clock.

The foregoing and/or other aspects of the present general inventive concept are also achieved by providing a method of recovering a carrier and a symbol timing usable in a digital broadcast receiver, the method comprising receiving a baseband signal and detecting a first error relating to a phase of a pilot signal thereof, a second error relating to a phase of a lower sideband thereof, and a third error relating to a phase of an upper sideband thereof, determining whether any of the pilot signal, the upper sideband, and the lower sideband are corrupted, and recovering an original clock and an original carrier according to at least one of the first, second, and third errors based on the determination and outputting the original clock and the original carrier used at a transmitting device.

The foregoing and/or other aspects of the present general inventive concept are also achieved by providing a recovery method, comprising receiving a baseband VSB signal, detecting a frequency offset of a pilot signal, an upper sideband, and a lower sideband, and generating a frequency offset corrected carrier using the detected frequency offsets of the pilot signal, the upper sideband, and the lower sideband.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

A carrier and symbol timing recovery apparatus according to embodiments of the present general inventive concept can be installed in a receiver to receive and demodulate a Vestigial Side Band (VSB) modulated signal. The carrier and symbol timing recovery apparatus performs a carrier recovery including minimizing frequency offset and phase noises, and a symbol timing recovery including symbol clock error correction between a transmitter and the receiver.

The carrier and symbol timing recovery apparatus according to the embodiments of the present general inventive concept can be installed in a digital broadcast receiving system that uses an 8-VSB modulation method in conformity with standards of the Advanced Television System Committee (ATSC). The following description will be based on an assumption that the carrier and symbol recovery apparatus of various embodiments of the present general inventive concept receives an 8-VSB digital broadcast signal. However, it should be understood that the carrier and symbol recovery apparatus of the embodiments of the present general inventive concept may be used with other types of digital broadcast signals.

The recovery apparatus (i.e., the carrier and symbol recovery apparatus) of the embodiments of the present general inventive concept acquires frequency offset information and symbol clock information from both a pilot signal and an upper or lower sideband signal component of the received VSB signal. In this manner, the carrier recovery and the symbol timing recovery can be smoothly and accurately performed irrespective of possible corruptions of the pilot signal and the upper sideband signal due to channel characteristics.

The carrier and symbol recovery apparatus of the embodiments of the present general inventive concept may include a single apparatus to acquire frequency offset information and to correct symbol clock error used for the carrier recovery and symbol timing recovery. This is different from conventional carrier and symbol recovery apparatuses in which a plurality of separate devices are utilized for recovering carrier and symbol timing. Since the same apparatus performs both the carrier and symbol timing recoveries, a hardware size of a system that includes the carrier and symbol recovery apparatus of the embodiments of the present general inventive concept is reduced considerably.

Figure 3:
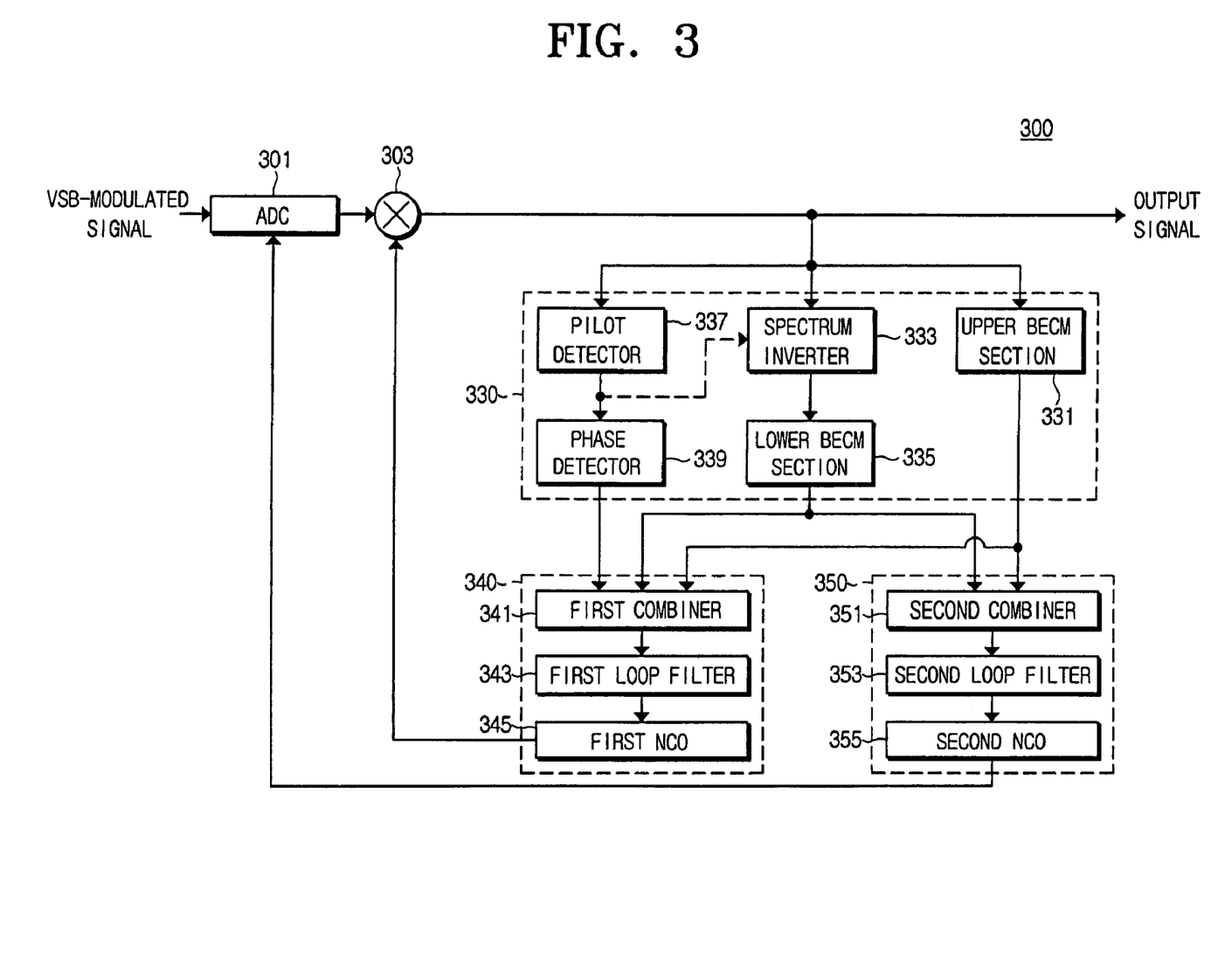
FIG. 3 is a schematic block diagram illustrating a carrier and symbol timing recovery apparatus usable with a VSB receiver according to an embodiment of the present general inventive concept.

FIG. 3 is a schematic block diagram illustrating a carrier and symbol timing recovery apparatus 300 usable with a VSB receiver according to an embodiment of the present general inventive concept.

Referring to FIG. 3, the carrier and symbol timing recovery apparatus 300 includes an analog-to-digital converter (ADC) 301, a multiplier 303, an error detector 330, a carrier generator 340, and a sample clock generator 350.

The carrier generator 340 recovers a carrier, the sample clock generator 350 recovers a symbol timing, and the error detector 330 detects an error for both the sample clock generator 350 and the carrier generator 340.

The ADC 301 samples a received VSB signal using a corrected sampling clock provided by the sample clock generator 350, and the multiplier 303 multiplies the digital (i.e., sampled) VSB signal by a frequency offset corrected carrier signal provided by the carrier generator 340 and converts the result of the multiplication to a baseband signal. Hereinafter, the baseband signal output by the multiplier 303 is referred to as a 'baseband VSB signal.'

The carrier recovery may be performed by the following procedure. The error detector 330 receives the baseband VSB signal and detects frequency offset information from a pilot signal and upper and lower sidebands of the received baseband VSB signal. The carrier generator 340 then generates a frequency offset corrected signal using the detected frequency offset information. The multiplier 303 then multiplies the frequency offset corrected signal by the digital VSB signal.

The symbol timing recovery may be performed by the following procedure. The error detector 330 receives the baseband VSB signal and detects symbol clock error information from the upper and lower sidebands of the received baseband VSB signal. The sample clock generator 350 then generates a corrected sampling clock as the predetermined sampling clock using the detected symbol clock error information, and provides the corrected sampling clock to the ADC 301.

A description of each component of the carrier and symbol timing recovery apparatus 300 according to an embodiment of the present general inventive concept will now be provided.

The ADC 301 receives the VSB signal and samples the received VSB signal according to a symbol timing recovered clock received from a second NCO 355.

The multiplier 303 receives a frequency offset corrected signal from a first NCO 345, and multiplies the frequency offset corrected signal by the digital VSB signal received from the ADC 301 (i.e., the sampled VSB signal). The result of the multiplication is then converted to the baseband VSB signal.

The baseband VSB signal can be output through a matched filter (not shown). The output signal may then be input to an equalizer (not shown) and equalized.

The error detector 330 detects the frequency offset information used for the carrier recovery and detects the symbol clock error information used for the symbol timing recovery, respectively, using the pilot signal and the upper and lower sidebands contained in the baseband VSB signal.

The error detector 330 includes an upper Band Edge Component Maximization (BECM) section 331, a spectrum inverter 333, a lower BECM section 335, a pilot detector 337, and a phase detector 339.

The error detector 330 of FIG. 3 will now be described with respect to frequency spectrums of the baseband VSB signals illustrated in FIGS. 1 and 4.

FIG. 1 is a graph illustrating the frequency spectrum of a VSB signal including a pilot signal. This VSB signal may be identical with the frequency spectrum of the baseband VSB signal output by the multiplier 303 according to an embodiment of the present general inventive concept.

Figure 4:
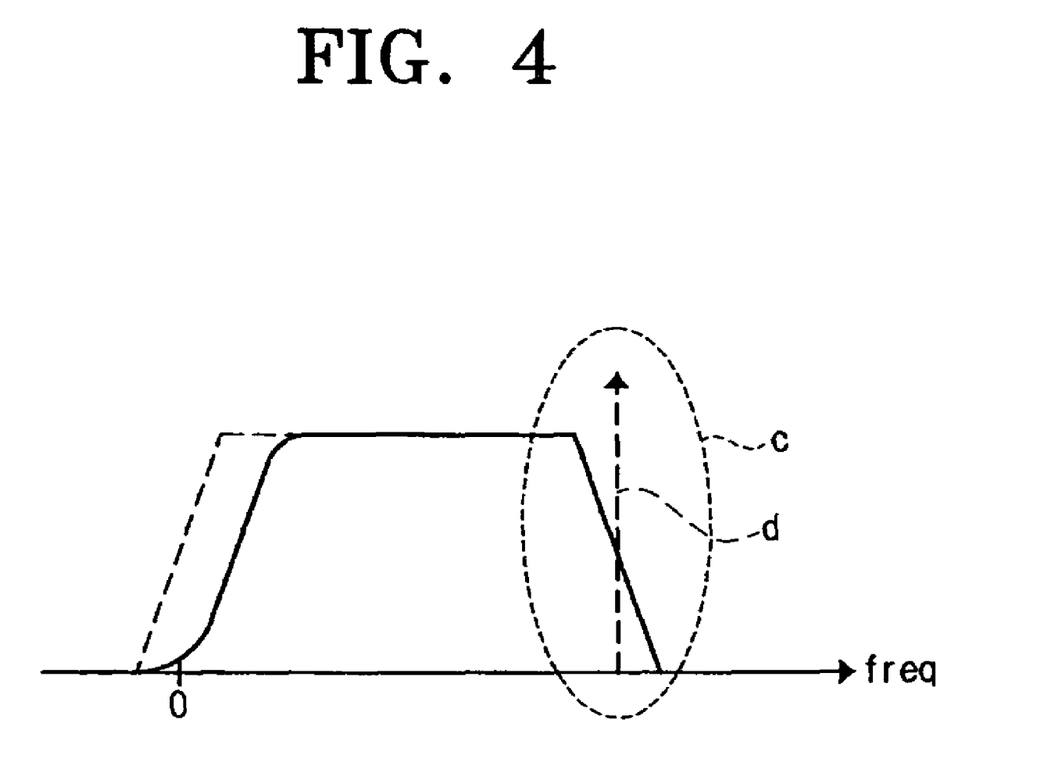
FIG. 4 is a graph illustrating a frequency spectrum of a baseband VSB signal.

FIG. 4 is a graph illustrating an inverted frequency spectrum of the baseband VSB signal compared to the frequency spectrum of FIG. 1.

As illustrated in FIG. 4, the lower sideband of the baseband VSB signal of FIG. 1 is shifted to the upper sideband 'c.' In other words, the spectrum inverter 333 inverts the frequency spectrum (illustrated in FIG. 1) of the baseband VSB signal to an inverted frequency spectrum (illustrated in FIG. 4). Therefore, a location of the pilot signal 'b' illustrated in FIG. 1 is changed to 'd' in FIG. 4.

The pilot detector 337 detects the pilot signal from the baseband VSB signal, and phase detector 339 generates and outputs pilot error information from the detected pilot signal. The pilot error information may include information about a phase of the pilot signal of the received VSB signal.

The upper BECM section 331 receives the baseband VSB signal that corresponds to the spectrum illustrated in FIG. 1 from the multiplier 303, and generates and outputs the carrier error information and the symbol clock error information (i.e., symbol timing error information) from the upper sideband 'a' of the received VSB signal (hereinafter 'upper error information'). The upper error information may include information about a phase of the upper sideband 'a' of the received VSB signal.

The upper BECM section 331 uses the BECM algorithm to generate the upper error information by performing the BECM algorithm on the upper sideband ('a' in FIG. 1) of the baseband VSB signal. A more detailed description of the upper BECM section 331 and the principle of the BECM algorithm is provided below.

The spectrum inverter 333 receives the baseband VSB signal that corresponds to the frequency spectrum illustrated in FIG. 1 from the multiplier 303, and inverts the frequency spectrum as illustrated in FIG. 4. As a result, the lower sideband of the frequency spectrum illustrated in FIG. 1 is shifted to the upper sideband 'c' of the frequency spectrum illustrated in FIG. 4. Similarly, the upper sideband 'a' of the frequency spectrum illustrated in FIG. 1 is shifted to the lower sideband of the frequency spectrum illustrated in FIG. 4. An output from the spectrum inverter 333 is provided to the lower BECM section 335.

The spectrum inverter 333 receives the pilot signal from the pilot detector 337, and may remove the pilot signal 'd' (see FIG. 4) from the spectrum inverted baseband VSB signal. The spectrum inverter 333 may remove the pilot signal, because the spectrum inverted baseband VSB signal includes the pilot signal 'd' as illustrated in FIG. 4, which may tend to influence the spectrum inverted baseband VSB signal.

Alternatively, the pilot signal 'd' may not be removed because error information acquired from a signal containing the pilot signal may be more reliable. FIG. 4 illustrates a situation in which the pilot signal 'd' is not removed and is output to the lower BECM section 335 with the spectrum inverted baseband VSB signal. The following description may be applied to a baseband VSB signal containing a pilot signal or a baseband VSB signal that does not contain the pilot signal, and it should be understood that the present general inventive concept may be used with or without the pilot signal.

The lower BECM section 335 corresponds to the upper BECM section 331 such that the lower BECM section 335 performs the same function as the upper BECM section 331. That is, the lower BECM section 335 generates and outputs error information (hereinafter 'lower error information') for the carrier and symbol timing recovery. The lower error information may include phase information about the lower sideband of the received VSB signal. The only difference between the two BECM sections is that the spectrum inverted baseband VSB signal having the frequency spectrum illustrated in FIG. 4 is input to the lower BECM section 335. Since the lower sideband of the baseband VSB signal illustrated in FIG. 1 is shifted to the upper side band 'c' of the frequency spectrum in FIG. 4, the lower BECM section 335 generates the lower error information by performing the BECM algorithm on the lower sideband of the frequency spectrum illustrated in FIG. 1, which is shifted to be the upper sideband 'c' of the frequency spectrum illustrated in FIG. 4.

Detailed structures of the upper and lower BECM sections 331 and 335 that use the BECM algorithm are now explained with reference to FIG. 5.

Figure 5:
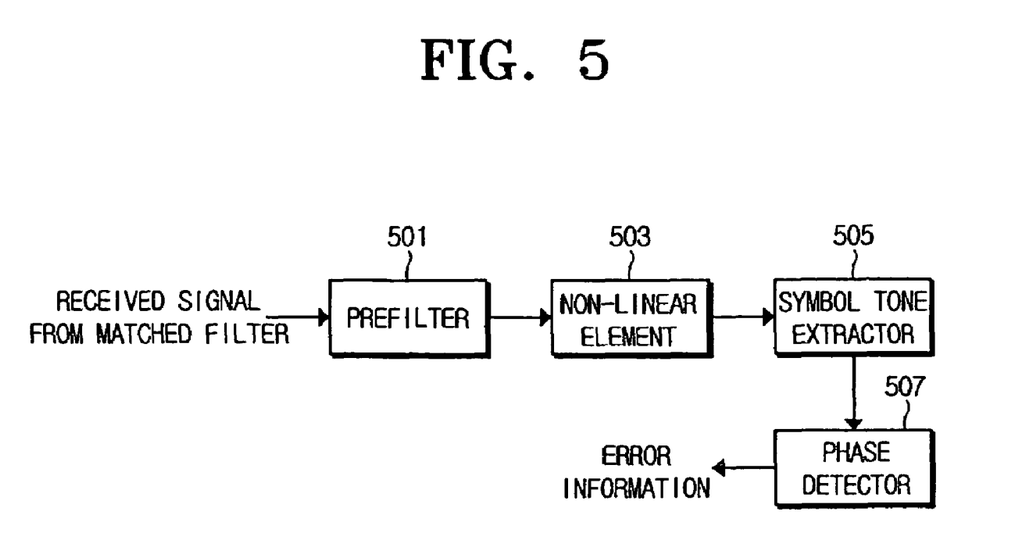
FIG. 5 is a schematic block diagram illustrating an upper BECM section of the carrier and symbol timing recovery apparatus of FIG. 3 according to an embodiment of the present general inventive concept.

FIG. 5 is a schematic block diagram illustrating the upper BECM section 331 of the carrier and symbol recovery apparatus 300 of FIG. 3 according to an embodiment of the present general inventive concept. The structure of the lower BECM section 335 may be identical to that of the upper BECM section 331 illustrated in FIG. 5.

The BECM algorithm generates error information by reading phase information of a received signal using a harmonic signal, or spectral line, which is the upper sideband of the baseband VSB signal. A typical example of the BECM algorithm is the Gardner system. In particular, the BECM algorithm generates an error signal that is proportional to a phase difference between a clock of a transmitting device and a clock of a receiving device.

Referring to FIG. 5, the upper BECM section 331 includes a prefilter 501, a non-linear element 503, a symbol tone extractor 505, and a phase detector 507.

The prefilter 501 receives the baseband VSB signal and filters only the upper sideband. The non-linear element 503 generates harmonic components of signals output from the prefilter 501 (i.e., the upper sideband).

The symbol tone extractor 505 extracts a symbol tone having the same frequency as the clock used in the transmitting device from among a plurality of harmonics generated by the non-linear element 503.

The phase detector 507 detects the symbol clock error information from a reference symbol phase, which is preset based on the symbol tone extracted by the symbol tone extractor 505 and a phase of the extracted symbol tone. The symbol clock error information may include information about a phase of the symbol clock of the received VSB signal.

As described above, the lower BECM section 335 may have the same structure and functions as the upper BECM section 331, except that the lower BECM section 335 receives a different (i.e., inverted) input signal.

The error detector 330, as illustrated in FIG. 3, generates and outputs three types of error information through the phase detector 339, the upper BECM section 331, and the lower BECM section 335, respectively. In effect, the carrier and symbol timing recovery may be accomplished by properly combining these three types of error information.

The carrier generator 340 that performs the carrier recovery includes a first combiner 341, a first loop filter 343, and a first NCO 345.

The first combiner 341 receives the upper error information, the lower error information, and the pilot error information from the upper BECM section 331, the lower BECM section 335, and the phase detector 339, respectively. The first combiner 341 multiplies the upper error information, the lower error information, and the pilot error information by a first weight K1, a second weight K2, and a third weight K3, respectively. Next, the first combiner 341 adds the results of the respective multiplications to obtain the carrier error information.

Here, the first, second, and third weights K1, K2, and K3 may vary depending on channel characteristics (or status) reflected in distortions of the pilot signal, the upper sideband, and the lower sideband contained in the received baseband VSB signal. In particular, a larger weight is assigned to error information of high reliability. Therefore, a large weight is usually assigned to the lower error information received from the lower BECM section 335, since the lower error information contains the pilot signal, which is more reliable. However, if the spectrum inverter 333 receives the pilot signal from the pilot detector 337, removes the pilot signal from the baseband VSB signal, and then inverts the frequency spectrum of the baseband VSB signal, the upper error information and the lower error information are determined to have the same level of reliability. In this case, the upper and lower error information may be multiplied by the first and second weights K1 and K2 of the same value, respectively.

In order to assign proper weights according to the channel characteristics, there are many ways to acquire information about the channel characteristics. For instance, the weights can be obtained by measuring magnitudes of the upper sideband, the lower sideband, and the pilot signal detected from the upper BECM section 331, the lower BECM section 335, and the pilot detector 337, respectively.

The first loop filter 343 detects a control signal having only a baseband signal component among the carrier error information received from the first combiner 341 and outputs the control signal to the first NCO 345. The first loop filter 343 can include a primary loop or secondary loops, depending on whether the frequency offset of the received VSB signal is to be corrected or whether both the frequency and phase offset of the received VSB signal is to be corrected. A coefficient value thereof is changeable by convergence steps.

The first NCO 345 is an oscillator circuit to output a frequency corrected oscillation signal according to the baseband signal component of the control signal received from the first loop filter 343. The output signal produced by the first NCO 345 has a frequency of the recovered carrier, and is output to the multiplier 303 where the VSB signal received from the ADC 301 is converted to the baseband VSB signal.

Unlike the carrier generator 340, the sample clock generator 350 that recovers a symbol timing uses the upper error information and the lower error information output by the error detector 330.

The sample clock generator 350 includes a second combiner 351, a second loop filter 353, and a second NCO 355.

The second combiner 351 receives the upper error information and the lower error information from the upper BECM section 331 and the lower BECM section 335, respectively. The second combiner 351 then combines and outputs the symbol timing error information to the second loop filter 353. More specifically, the second combiner 351 multiplies the upper error information and the lower error information by a fourth weight K4 and a fifth weight K5, respectively, and adds the results of the respective multiplications to produce the symbol timing error information.

The fourth and fifth weights K4 and K5 may vary depending on the channel characteristics reflected in distortions of the upper and lower sideband signals contained in the received baseband VSB signal. Thus, a larger weight is assigned to error information of high reliability. Therefore, a large weight is typically assigned to the lower error information received from the lower BECM section 335 since the lower error information contains the pilot signal, which is more reliable.

Similar to the first, second, and third weights K1, K2 and K3 described above, there are many ways to acquire information about the channel characteristics in order to assign proper weights for different channel characteristics. For instance, the fourth and fifth weights K4 and K5 can be obtained by measuring magnitudes of signals input to the upper BECM section 331 and the lower BECM section 335.

However, because the carrier frequency offset and the symbol timing offset influence the upper sideband and the lower sideband differently, the following conditions in Table 1 are set.

TABLE 1

If K1 × K2 > 0, K4 × K5 < 0
If K1 × K2 < 0, K4 × K5 > 0

That is, if the symbols of the first and second weights K1 and K2 for the carrier recovery are the same, the symbols of the fourth and fifth weights K4 and K5 should be different. Additionally, if the symbols of the first and second weights K1 and K2 for the carrier recovery are different from each other, the symbols of the fourth and fifth weights K4 and K5 should be the same. In another embodiment of the present general inventive concept the symbols may be changed by performing a predetermined operation on the outputs from the upper and lower BECM sections 331 and 335.

The first and second weights K1 and K2 for the carrier recovery can be set to be the same symbols, and the fourth and fifth weights K4 and K5 for the symbol timing recovery may be set to different symbols.

The second loop filter 353 filters or passes only a baseband signal component among the symbol timing error information received from the second combiner 351, and outputs the baseband signal component to the second NCO 355.

The second NCO 355 changes an output frequency and a sampling clock of the ADC 301 according to the baseband signal component received from the second loop filter 353 to recover the symbol timing.

There are three ways that the carrier and symbol timing recovery apparatus 300 performs the carrier and symbol timing recovery. First, the recovery apparatus 300 can recover the carrier and the symbol timing using the upper error information acquired through the upper BECM section 331. Second, the recovery apparatus 300 can recover the carrier and the symbol timing using the lower error information acquired through the spectrum inverter 333 and the lower BECM section 335. Finally, the recovery apparatus 300 can recover the carrier and the symbol timing using the pilot error information acquired through the pilot detector 337 and the phase detector 339.

The upper BECM section 331 and the lower BECM section 335 can perform the carrier and symbol timing recovery independently or together as in an integrated path using the first and second combiners 341 and 351 as illustrated in FIG. 3. In particular, with regard to the carrier recovery, all the components of the recovery apparatus 300 including the upper and lower BECM sections 331 and 335, the spectrum inverter 333, the pilot detector 337, and the phase detector 339 may participate in the carrier recovery. Alternatively, the components of the recovery apparatus 300 can be used individually to provide necessary information.

However, in order to recover the carrier and the symbol timing at the same time using a single apparatus as in some of the embodiments of the present general inventive concept, the upper error information received from the upper BECM section 331 and the lower error information received from the lower BECM section 335 can be used together. The pilot detector 337 and the phase detector 339 may or may not be used. In the case when the pilot detector 337 and the phase detector 339 are not used, the third weight K3 is assigned to equal zero.

In another embodiment of the present general inventive concept, a separate controller (not shown) can be used to implement an error detector to generate one of the upper error information and the lower error information. In this case, the carrier recovery and the symbol timing recovery may not be performed simultaneously. Therefore, the controller controls the error detector, the carrier generator 340, and the sample clock generator 350 in order to execute the carrier recovery and the symbol timing recovery sequentially.

Figure 6:
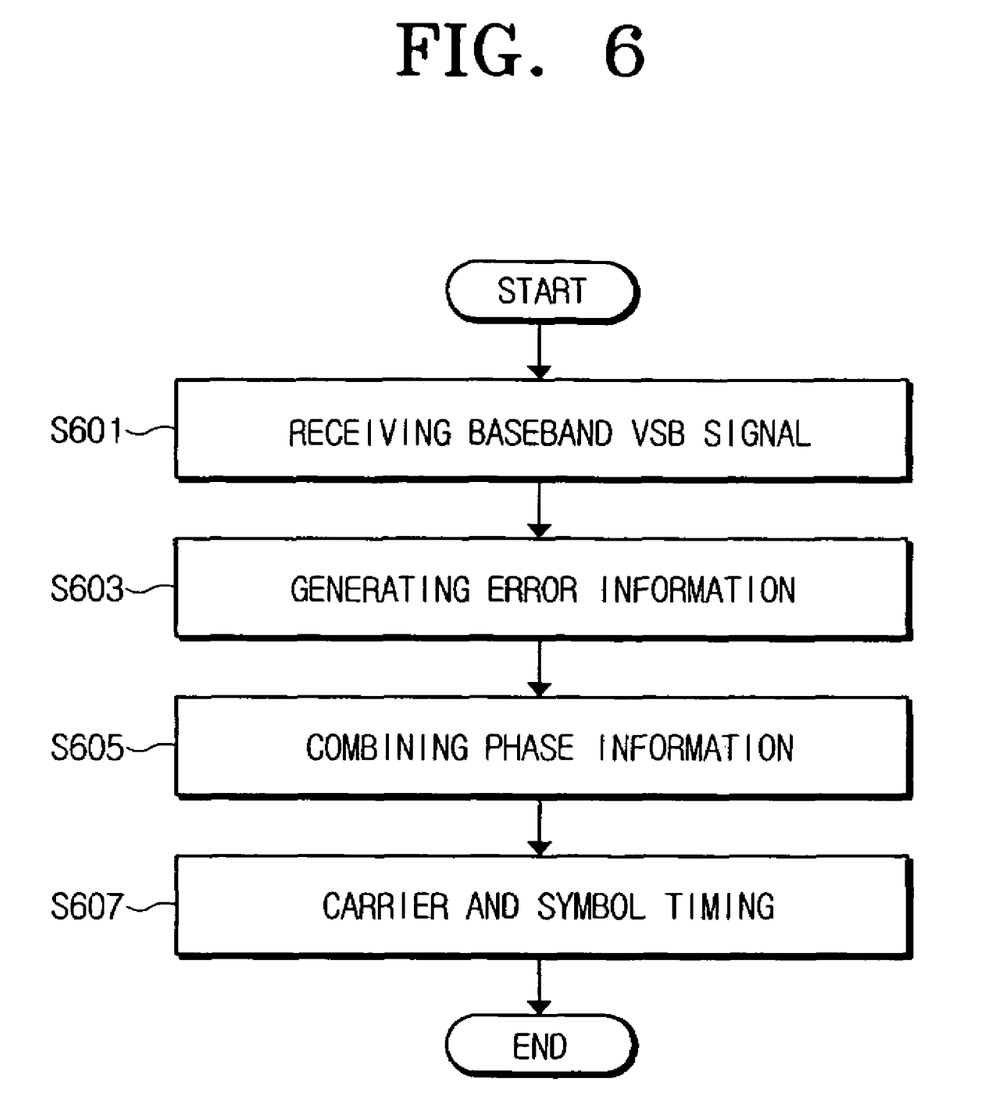
FIG. 6 is a flow chart illustrating a method of recovering a carrier and symbol timing according to an embodiment of the present general inventive concept.

FIG. 6 is a flow chart illustrating a method of recovering a carrier and symbol timing according to an embodiment of the present general inventive concept. For illustration purposes, the method of recovering the carrier and symbol timing is described below with reference to FIGS. 1 and 3 to 6, and the carrier and symbol timing recovery apparatus 300 of FIG. 3.

The ADC 301 digitizes the received VSB-modulated signal. The multiplier 303 receives the digital VSB-modulated signal and multiplies the digital VSB-modulated signal by an output signal received from the first NCO 345 to generate the baseband VSB signal having the frequency spectrum illustrated in FIG. 1. The baseband VSB signal is input to the upper BECM section 331, the pilot detector 337, and the spectrum inverter 333 of the error detector 330, respectively (operation S601).

The upper BECM section 331 of the error detector 330 performs the BECM algorithm using the upper sideband 'a' (FIG. 1) of the baseband VSB signal received from the multiplier 303 and generates the upper error information accordingly.

The spectrum inverter 333 inverts the frequency spectrum of the baseband VSB signal received from the multiplier 303 and generates and outputs a signal having the frequency spectrum illustrated in FIG. 4 to the lower BECM section 335. The lower BECM section 335 performs the BECM algorithm using the upper sideband 'c' of the spectrum inverted baseband VSB signal and generates the lower error information accordingly (operation S603).

The pilot detector 337 detects the pilot signal in the baseband VSB signal received from the multiplier 303 and outputs the detected pilot signal to the phase detector 339. The phase detector 339 generates pilot error information from the detected pilot signal (operation S603).

The first combiner 341 receives the upper error information, the lower error information, and the pilot error information from the upper BECM section 331, the lower BECM section 335, and the phase detector 339, respectively, and multiplies the upper error information, the lower error information, and the pilot error information by the first, second, and third weights K1, K2 and K3, respectively. The first combiner 341 then adds the respective multiplication results and generates the carrier error information (operation S605).

The second combiner 351 receives the upper error information and the lower error information from the upper BECM section 331 and the lower BECM section 335, respectively, and multiplies the upper error information and the lower error information by the fourth and fifth weights K4 and K5, respectively. The second combiner 351 then adds the respective multiplication results to generate the symbol timing error information for the symbol timing recovery (operation S605).

The first loop filter 343 receives the carrier error information from the first combiner 341, and outputs the control signal to the first NCO 345. The first NCO 345 varies a frequency used to recover the carrier according to the control signal received from the first loop filter 343, and outputs the recovered carrier to the multiplier 303 (operation S607).

The second loop filter 353 receives the symbol timing error information from the second combiner 351, and outputs the control signal to the second NCO 355. The second NCO 355 generates the corrected sampling clock as the predetermined sampling clock, which is recovered from the symbol clock error information, according to the control signal received from the second loop filter 353, and outputs the recovered (i.e., corrected) sampling clock to the ADC 301 so that the symbol timing recovery can be performed (operation S607).

The various embodiments of the present general inventive concept can be used to recover a carrier and/or symbol timing irrespective of corruption that occurs in a pilot signal.

Additionally, even though an upper sideband of a received VSB-modulated signal may be corrupted, the various embodiments of the present general inventive concept can recover a symbol timing by using a lower sideband of the received VSB-modulated signal instead of the upper sideband. Therefore, performance of a receiving system can be improved despite channel characteristics that cause distortion and/or corruption.

Furthermore, a simple hardware design may be used to implement the various embodiments of the present general inventive concept to detect error information for carrier recovery and symbol timing recovery using a single apparatus.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A carrier and symbol timing apparatus usable with a Vestigial Side Band (VSB) receiver, the apparatus comprising:
    an analog-to-digital converter (ADC) to receive a VSB-modulated signal and to convert the received VSB-modulated signal to a digital signal using a predetermined sampling clock;
    a multiplier to multiply the digital signal by a carrier signal of a predetermined frequency and to convert a result of the multiplication to a baseband VSB signal;
    an error detector to perform a predetermined algorithm on an upper sideband and a lower sideband of the baseband VSB signal, respectively, and to generate upper error information and lower error information based on a difference between phase information of the received VSB-modulated signal and a predetermined reference phase information;
    a carrier generator to combine the upper error information and the lower error information to generate a frequency offset-corrected carrier; and
    a sample clock generator to combine the upper error information and the lower error information to generate a symbol clock error-corrected sampling clock.

2. The apparatus according to claim 1, wherein the predetermined algorithm comprises a Band Edge Component Maximization (BECM) algorithm.

3. The apparatus according to claim 2, wherein the error detector comprises:
    an upper BECM section to perform the BECM algorithm on the baseband VSB signal to generate the upper error information;
    a spectrum inverter to invert the upper sideband and the lower sideband of the baseband VSB signal to invert a frequency spectrum of the baseband VSB signal; and
    a lower BECM section to perform the BECM algorithm on the spectrum inverted signal to generate the lower error information.

4. The apparatus according to claim 3, wherein the spectrum inverter detects and removes a pilot signal contained in the baseband VSB signal before inverting the frequency spectrum of the baseband VSB signal.

5. The apparatus according to claim 3, wherein the error detector further comprises:
    a pilot detector to detect a pilot signal contained in the baseband VSB signal; and
    a phase detector to detect pilot phase information from the detected pilot signal as the phase information of the received VSB-modulated signal and to output the pilot phase information to the carrier generator.

6. The apparatus according to claim 5, wherein the carrier generator comprises:
    a first combiner to multiply the pilot phase information, the upper error information, and the lower error information by predetermined weights, respectively, and to output a sum of the respective multiplication results as carrier error information;
    a first loop filter to filter a low-band signal from the carrier error information; and
    a first Numerically Controlled Oscillator (NCO) to output the carrier signal that is frequency offset corrected to the multiplier according to the filtered low-band signal.

7. The apparatus according to claim 6, wherein the predetermined weights vary depending on reliabilities of the pilot phase information, the upper error information, and the lower error information, respectively, under different channel characteristics.

8. The apparatus according to claim 1, wherein the carrier generator comprises:
a first combiner to multiply the upper error information and the lower error information by predetermined weights, respectively, and to output a sum of the respective multiplication results as carrier error information;
a first loop filter to filter a low-band signal from the carrier error information; and
a first NCO to output the carrier signal that is frequency offset corrected to the multiplier according to the filtered low-band signal.

9. The apparatus according to claim 1, wherein the sample clock generator comprises:
a combiner to multiply the upper error information and the lower error information by predetermined weights, respectively, and to output a sum of the respective multiplication results as symbol timing error information;
a loop filter to filter a low-band signal from the symbol timing error information; and
a NCO to output the symbol clock error-corrected sampling clock as the predetermined sampling clock to the ADC according to the filtered low-band signal.

10. The apparatus according to claim 1, wherein:
the carrier generator comprises:
a first combiner to multiply the upper error information and the lower error information by predetermined first and second weights, respectively, and to output a sum of the respective multiplication results as carrier error information;
a first loop filter to filter a first low-band signal from the carrier error information; and
a first NCO to output the carrier signal that is frequency offset corrected to the multiplier under the control of the filtered first low-band signal, and
the sample clock generator comprises:
a second combiner to multiply the upper error information and the lower error information by predetermined third and fourth weights, respectively, and to output a sum of the respective multiplication results as symbol timing error information;
a second loop filter to filter a second low-band signal from the symbol timing error information; and
a second NCO to output the symbol clock error-corrected sampling clock as the predetermined sampling clock to the ADO according to the filtered second low-band signal.

11. The apparatus according to claim 10, wherein among the first, second, third, and fourth weights, the first and second weights are the same symbols, and the third and fourth weights are different symbols.

12. The apparatus according to claim 10, wherein among the first, second, third, and fourth weights, the first and second weights are different symbols, and the third and fourth weights are the same symbols.

13. The apparatus according to claim 1, wherein the VSB-modulated signal comprises a digital broadcast signal that conforms to standards of the Advanced Television System Committee (ATSC).

14. A recovery apparatus usable with a digital broadcast receiver, the apparatus comprising:
a receiving unit to receive a signal having a carrier and a clock on a wireless channel and to generate a baseband signal from the received signal;
an error detector to detect error information in at least two portions of the baseband signal; and
a carrier generator to generate a frequency offset adjusted carrier by combining the detected error information of the at least two portions of the baseband signal.

15. The recovery apparatus according to claim 14, further comprising:
a symbol timing recovery unit to generate a timing adjusted clock by combining the detected error information of the at least two portions of the baseband signal.

16. The recovery apparatus according to claim 15, wherein the at least two portions of the baseband signal comprise an upper sideband thereof and a lower sideband thereof.

17. The recovery apparatus according to claim 15, wherein the baseband signal comprises a pilot signal and the at least two portions of the baseband signal do not include the pilot signal.

18. The recovery apparatus according to claim 15, wherein the receiving unit comprises:
an analog to digital converter to receive the signal on the wireless channel and to convert the received signal to a digital signal by sampling the received signal according to the timing adjusted clock; and
a multiplier to generate the baseband signal by multiplying the digital signal by the frequency offset adjusted carrier.

19. The recovery apparatus according to claim 15, wherein the carrier generator and the symbol timing recovery unit repeatedly adjust the carrier and the clock, respectively, until an original carrier and an original clock are recovered.

20. The recovery apparatus according to claim 15, wherein the baseband signal includes a pilot signal, an upper sideband, and a lower sideband.

21. The recovery apparatus according to claim 20, wherein the error detector comprises:
a pilot error unit to determine pilot error information from the pilot signal;
an upper sideband error unit to determine upper error information from the upper sideband; and
a lower sideband error unit to determine lower error information from the lower sideband.

22. The recovery apparatus according to claim 21, wherein the carrier generator comprises:
a first combiner to assign a first, a second, and a third weight to the pilot error information, the lower error information, and the upper error information, respectively, according to a reliability determination of the pilot error information, the lower error information, and the upper error information, and to combine the weighted pilot error information, the weighted lower error information, and the weighted upper error information to generate carrier error information;
a first filter to generate a control signal by filtering a baseband signal component from the carrier error information; and
a first oscillator to generate the frequency offset adjusted carrier according to the control signal and to provide the frequency offset adjusted carrier to the receiving unit.

23. The recovery apparatus according to claim 21, wherein:
the upper sideband error unit comprises an upper BEOM unit to perform a band edge component maximization algorithm on the baseband signal to determine the upper error information; and
the lower sideband error unit comprises:
a spectrum inverter to invert a frequency spectrum of the baseband signal such that the lower sideband and the upper sideband thereof are inverted, and a lower BECM unit to perform the band edge component maximization algorithm on the spectrum inverted baseband signal to determine the lower error information.

24. A recovery apparatus usable in a digital broadcast receiver, the recovery apparatus comprising:
an error detector to receive a baseband signal and to detect a first error relating to a phase of a pilot signal thereof, a second error relating to a phase of a lower sideband thereof, and a third error relating to a phase of an upper sideband thereof; and
a recovery unit to determine whether any of the pilot signal, the upper sideband, and the lower sideband are corrupted, to recover an original clock and an original carrier according to at least one of the first, second, and third errors based on the determination, and to output the original clock and the original carrier used at a transmitting device.

25. The recovery apparatus according to claim 24, further comprising:
a receiving unit to receive a signal having an offset clock and an offset carrier and to generate the baseband signal from the received signal according to the offset clock and the offset carrier, to receive the original carrier and the original clock from the recovery unit, and to adjust the offset clock to the original clock and the offset carrier to the original carrier.

26. The recovery apparatus according to claim 24, wherein the error detector comprises:
a pilot error unit to detect the pilot signal in the baseband signal and to compare the detected pilot signal to a predetermined first reference phase to determine the first error;
a lower error unit to invert a spectrum of the baseband signal and to perform a band edge component maximization algorithm on the inverted spectrum of the baseband signal to determine the second error; and
an upper error unit to perform the band edge component maximization algorithm on the baseband signal to determine the third error.

27. The recovery apparatus according to claim 26, wherein the lower error unit generates lower error information that comprises a phase difference between the lower sideband and a predetermined second reference phase, and the upper error unit generates upper error information that comprises a phase difference between the upper sideband and a predetermined third reference phase.

28. The recovery apparatus according to claim 26, wherein the upper error unit comprises:
a prefilter to receive the baseband signal and to filter the upper sideband therefrom; and
a non-linear element to generate harmonic components from the filtered upper sideband received from the prefilter;
a symbol toner extractor to extract a symbol tone having the same frequency as the original clock used by the transmitting device that transmits a signal to the digital broadcast receiver from the harmonic components generated by the non-linear element; and
a phase detector to detect a clock phase error according to the extracted symbol tone as the third error.

29. The recovery apparatus according to claim 26, wherein the lower error unit comprises:
a spectrum inverter to invert a spectrum of the baseband signal such that the lower sideband is inverted to the upper sideband;
a prefilter to receive the inverted baseband signal and to filter the inverted lower sideband therefrom; and
a non-linear element to generate harmonic components from the filtered inverted lower sideband received from the prefilter;
a symbol toner extractor to extract a symbol tone having the same frequency as the original clock used by the transmitting device that transmits a signal to the digital broadcast receiver from the harmonic components generated by the non-linear element; and
a phase detector to detect a clock phase error according to the extracted symbol tone as the second error.

30. The recovery apparatus according to claim 24, wherein the recovery unit comprises a single apparatus having a carrier recovery unit and a symbol timing recover unit integrally included therewith.

31. The recovery apparatus according to claim 24, wherein the recovery unit determines whether any of the pilot signal, the upper sideband, and the lower sideband are corrupted to account for varying channel characteristics in a carrier recovery operation and a symbol timing recovery operation.

32. The recovery apparatus according to claim 24, wherein the baseband signal is derived from an 8 Vestigial Side Band signal that complies with the ATSC standard.

33. The recovery apparatus according to claim 24, wherein the recovery unit weights the first, second, and third errors according to the determination by assigning larger weights to more reliable ones of the first, second, and third errors.

34. A recovery apparatus, comprising:
an error detector to receive a baseband VSB signal and to detect a frequency offset of a pilot signal, an upper sideband, and a lower sideband, and to detect a phase offset of the upper sideband and the lower sideband;
a carrier generator to generate a frequency offset corrected carrier using the detected frequency offsets of the pilot signal, the upper sideband, and the lower sideband; and
a sample clock generator to recover a symbol timing using the phase offsets of the upper and lower sidebands.

35. A digital broadcast receiver, comprising:
a carrier and symbol timing recovery apparatus, comprising:
an error detector to receive a baseband signal and to detect a first error relating to a phase of a pilot signal thereof, a second error relating to a phase of a lower sideband thereof, and a third error relating to a phase of an upper sideband thereof; and
a recovery unit to determine whether any of the pilot signal, the upper sideband, and the lower sideband are corrupted, to recover an original clock and an original carrier according to at least one of the first, second, and third errors based on the determination, and to output the original clock and the original carrier.

36. An error and symbol timing recovery method usable in a digital broadcast receiver, the method comprising:
receiving with the digital broadcast receiver a VSB-modulated signal and converting the received VSB-modulated signal to a digital signal using a predetermined sampling clock;
multiplying the digital signal by a carrier signal of a predetermined frequency with a multiplier and converting a result of multiplication to a baseband VSB signal;
performing a predetermined algorithm on an upper sideband and a lower sideband of the baseband VSB signal, respectively, and generating upper error information and lower error information based on a difference between phase information of the received VSB-modulated signal and a predetermined reference phase information;

combining the upper error information and the lower error information and generating a frequency offset-corrected carrier therefrom; and combining the upper error information and the lower error information and generating a symbol clock error-corrected sampling clock as the predetermined sampling clock.

37. The method according to claim 36, wherein the generating of the upper error information and the lower error information comprises:

performing a Band Edge Component Maximization (BECM) algorithm on the baseband VSB signal to generate the upper error information;

inverting the upper sideband and the lower sideband of the baseband VSB signal and inverting a spectrum thereof; and performing the BECM algorithm on the spectrum inverted signal to generate the lower error information.

38. The method according to claim 36, wherein the generating of the frequency offset-corrected carrier comprises multiplying the upper error information and the lower error information by a first and a second weight, respectively, and adding the respective multiplication results together, and the generating of the symbol clock error-corrected sampling clock comprises multiplying the upper error information and the lower error information by a third and a fourth weight, respectively, and adding the respective multiplication results together.

39. The method according to claim 38, wherein among the first, second, third, and fourth weights, the first and second weights are the same symbols, and the third and fourth weights are different symbols.

40. The method according to claim 38, wherein among the first, second, third, and fourth weights, the first and second weights are different symbols, and the third and fourth weights are the same symbols.

41. A method of recovering a carrier and a symbol timing of a carrier and symbol timing apparatus usable with a VSB receiver, the method comprising:

receiving a signal with the VSB receiver having the carrier and the symbol timing on a wireless channel;

determining phase information for at least a first portion of the received signal and a second portion of the received signal;

generating a first error information and a second error information to correspond with the first portion and the second portion of the received signal, respectively, by comparing the phase information of the first and second portions with a reference phase information; and combining the first error information and the second error information to produce a frequency offset-corrected carrier and symbol clock error-corrected sampling clock.

42. A method of recovering an original carrier and an original clock usable in a digital broadcast receiver, the method comprising:

receiving a baseband signal with the digital broadcast receiver and detecting a first error relating to a phase of a pilot signal thereof, a second error relating to a phase of a lower sideband thereof, and a third error relating to a phase of an upper sideband thereof;

determining whether any of the pilot signal, the upper sideband, and the lower sideband are corrupted; and recovering the original clock and the original carrier according to at least one of the first, second, and third errors based on the determination and outputting the original clock and the original carrier used at a transmitting device.

43. A recovery method usable in a digital broadcast receiver, comprising:

receiving a baseband VSB signal with the digital broadcast receiver;

detecting a frequency offset of a pilot signal, an upper sideband, and a lower sideband, and detecting a phase offset of the upper sideband and the lower sideband;

generating a frequency offset corrected carrier using the detected frequency offsets of the pilot signal, the upper sideband, and the lower sideband; and generating a sample clock to recover a symbol timing using the phase offsets of the upper and lower sidebands.

44. The recovery method according to claim 43, wherein the detecting of the frequency offset further comprises detecting a phase offset of the upper sideband and the lower sideband, and the recovery method further comprises:

recovering a symbol timing using the phase offsets of the upper and lower sidebands.

45. A recovery method usable in a digital broadcast receiver, comprising:

receiving a signal having a carrier and a symbol timing on a wireless channel with the digital broadcast receiver;

generating a baseband signal from the received signal;

detecting error information in at least two portions of the baseband signal; and generating a frequency offset adjusted carrier by combining the detected error information of the at least two portions of the baseband signal.

46. A recovery method usable in a digital broadcast receiver, comprising:

detecting a first error relating to a phase of a pilot signal, a second error relating to a phase of a lower sideband, and a third error relating to a phase of an upper sideband of a received baseband signal that is received with the digital broadcast receiver;

recovering an original clock and an original carrier according to at least one of the first, second, and third errors based on determining whether any of the pilot signal, the upper sideband, and the lower sideband are corrupted; and outputting the original clock and the original carrier.

* * * * *

UNITED STATES PATENT AND TRADEMARK OFFICE
CERTIFICATE OF CORRECTION

| | | |
|---|---|---|
| PATENT NO. | : 7,643,577 B2 | Page 1 of 1 |
| APPLICATION NO. | : 11/237815 | |
| DATED | : January 5, 2010 | |
| INVENTOR(S) | : Dong-hoon Lee | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Twenty-first Day of December, 2010

David J. Kappos
*Director of the United States Patent and Trademark Office*